Figure 1:
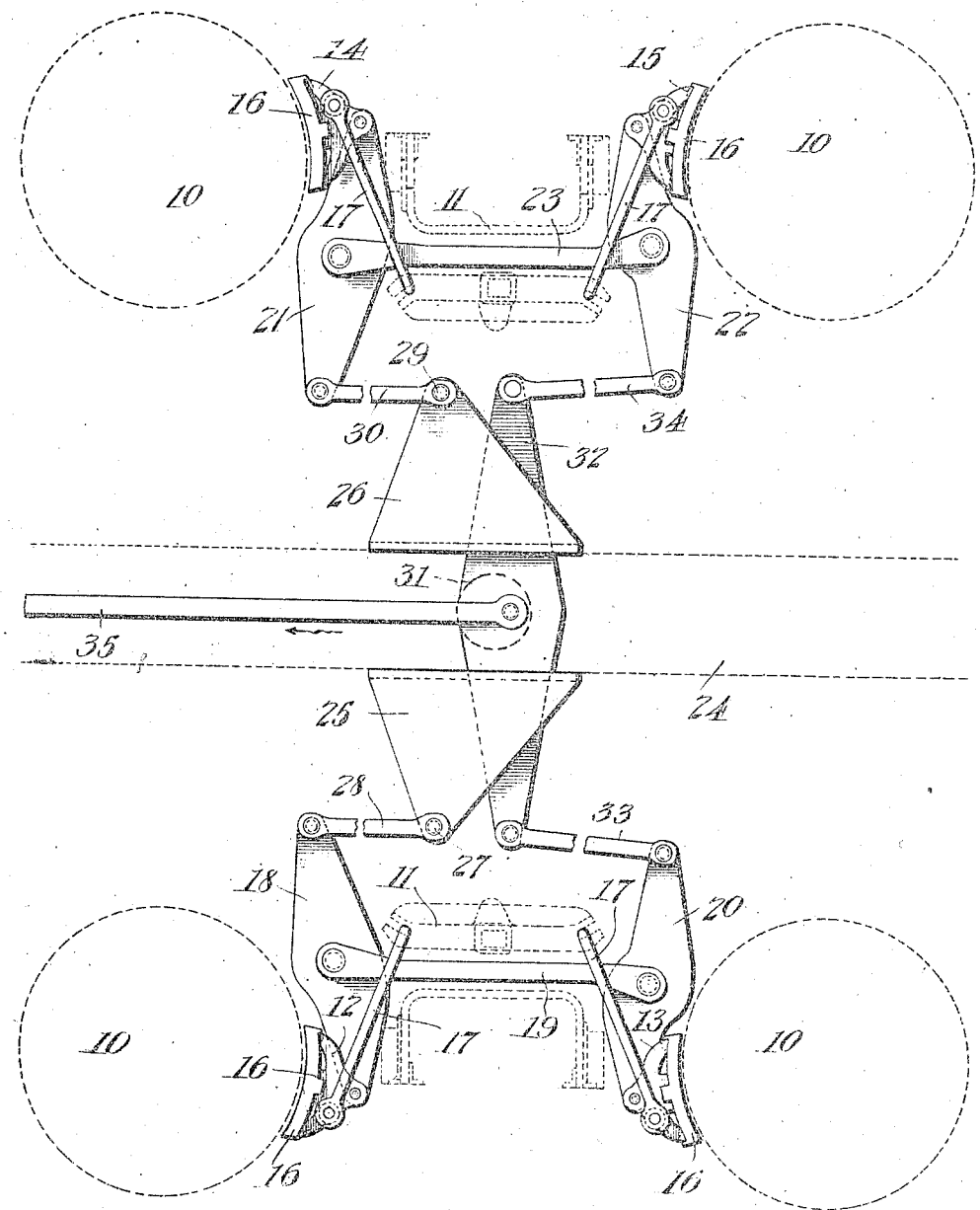

W. F. KIESEL, Jr.
CAR BRAKE.
APPLICATION FILED JUNE 27, 1913.

1,092,917.

Patented Apr. 14, 1914.
2 SHEETS—SHEET 1.

Witnesses

Inventor
William F. Kiesel Jr.
By
Attorneys

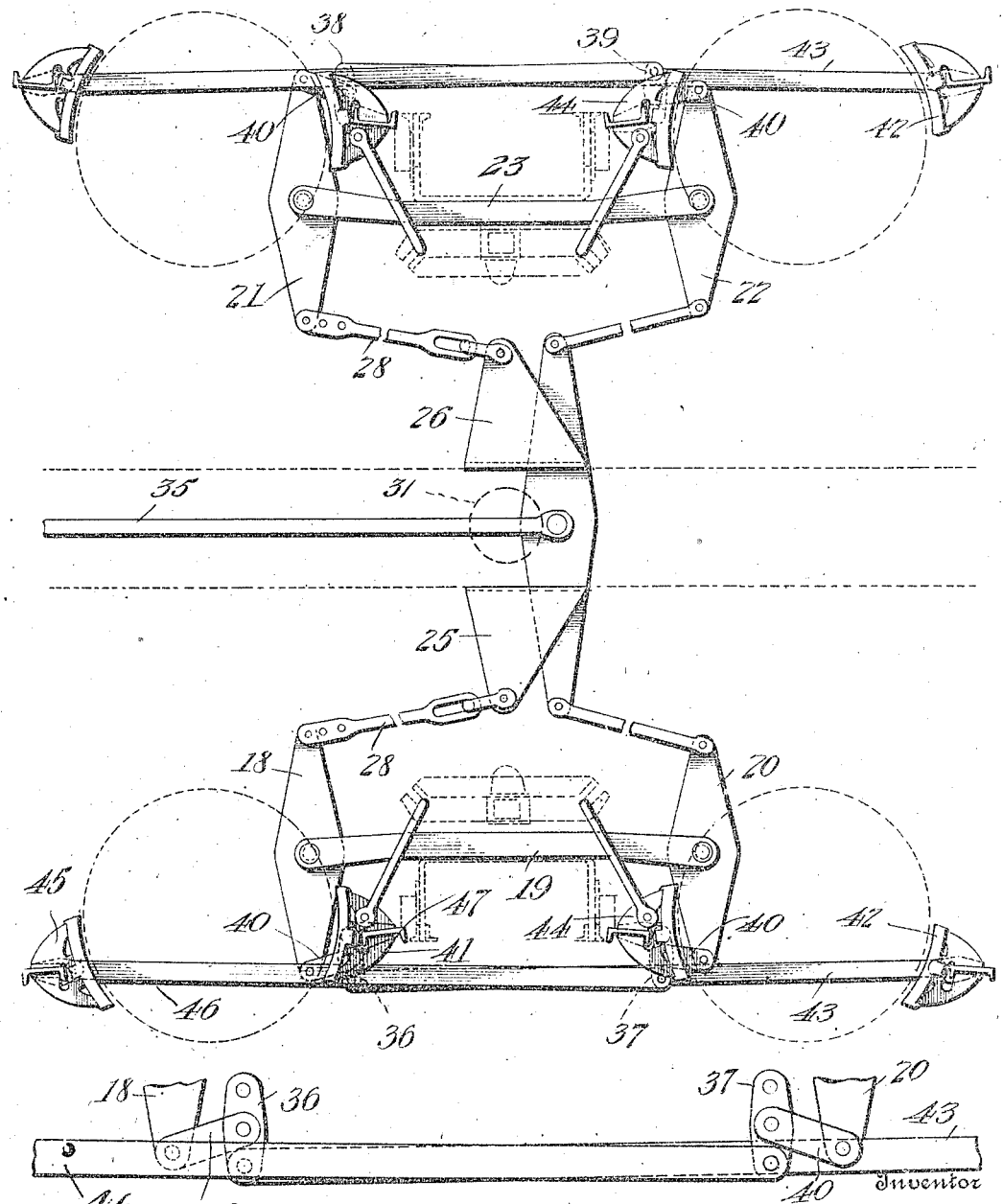

UNITED STATES PATENT OFFICE.

WILLIAM F. KIESEL, JR., OF ALTOONA, PENNSYLVANIA.

CAR-BRAKE.

1,092,917.

Specification of Letters Patent. Patented Apr. 14, 1914.

Application filed June 27, 1913. Serial No. 776,196.

*To all whom it may concern:*

Be it known that I, WILLIAM F. KIESEL, Jr., a citizen of the United States, and resident of Altoona, county of Blair, State of Pennsylvania, have invented certain new and useful Improvements in Car-Brakes, of which the following is a specification.

This invention relates to car brakes and more particularly to improvements in the brake construction shown in my prior Patent No. 805,364.

In the present forms of brake construction, such as is shown in my prior patent above referred to, it is customary to connect the dead lever with a point on the truck, with the result that when the brakes are applied there is a tendency to tilt the truck toward the center of the car and the car is subjected to considerable jarring and vibration.

One of the objects of the present invention is to eliminate these objectionable features in the prior constructions.

Another object is to provide an improved arrangement of the brake rigging wherein the brakes are applied to opposite sides of the same wheel.

Other objects and the features of novelty will be apparent from the foregoing description taken in connection with the drawings in which, Figure 1 is a composite plan of a brake rigging embodying my invention, the portions of the rigging at the sides of the truck being shown in a horizontal plane for the purpose of more clearly illustrating the invention; Fig. 2 is a similar view of another form of the invention in which brakes of the "clasp" type are employed; Fig. 3 is an enlarged plan of a portion of Fig. 2.

Referring to Fig. 1, 10 indicates the wheels of an ordinary four-wheel truck, the frame 11 of which is indicated in broken lines. Brake heads 12, 13, 14 and 15 are arranged adjacent the treads of the wheels 10 and carry the usual brake shoes 16. The brake heads are held in position by the usual suspending links 17 which have their upper ends connected with the truck frame and the lower ends pivoted to the brake heads as shown. The brake head 12 has pivoted thereto a substantially vertical lever 18 which is connected by means of an equalizing link 19 with a corresponding lever 20, pivoted at its lower end to the brake head 13. Similarly, the brake head 14 on the opposite side of the truck has connected therewith a substantially vertical lever 21 and the brake head 15 has connected therewith a lever 22, these levers being connected by a link 23 similar to the link 19. The center sill of the car is indicated at dotted lines at 24 and has secured on opposite sides thereof the brackets 25 and 26. The bracket 25 has a pivot 27 which is connected with the upper end of the lever 18 by means of a link 28. The bracket 26 is similarly provided with a pivot 29 which is connected with the upper end of the lever 21 by a link 30. As will be observed from the drawing the pivots 27 and 29 are close to and substantially on the transverse center line through the truck pivot 31. A horizontal equalizing lever 32 extending transversely of the car has one end connected with the lever 20 by means of a link 33 and the other end connected with the lever 22 by means of a link 34. The lever 32 also has connected therewith a rod 35 which extends to the usual brake actuating mechanism carried by the car.

In the operation of the brakes the rod 35 is drawn in the direction of the arrow and the motion is transmitted through the equalizing lever 32 and the links 33 and 34 to the live levers 20 and 22, the motion being transmitted from the live levers 20 and 22 to the dead levers 18 and 21 by means of the links 19 and 23. The upper ends of the dead levers 18 and 21 are held by means of the dead lever anchor rods 28 and 30 respectively so that the forces in the parts carried by the truck are neutralized and there will be no tendency to tilt the truck. The jarring and vibration will also be eliminated because of the neutralizing effect of the forces in the parts carried by the truck. On account of the anchor rod pivots 27 and 29 being substantially on the transverse center line through the truck pivot there will be little or no distortion of the brake mechanism due to the swiveling of the truck when the car is passing around a curve.

Referring to Fig. 2, it will be seen that the mechanism is substantially the same as that shown in Fig. 1 with the exception that each wheel has a brake shoe on opposite sides thereof. Instead of connecting the vertical levers 18, 20, 21 and 22 directly with the brake heads, as in Fig. 1. I connect them with small equalizing levers 36, 37, 38 and 39, respectively, by means of links 40. The upper ends of the lever 36 is connected with the adjacent brake head 41 and the lower end of this lever is connected with the brake head 42 on the corresponding side of another wheel, by means of a link 43. In a similar manner the lever 37 has its upper end connected with the brake head 44 and its lower end connected with a brake head 45 on the corresponding side of another wheel by means of a link 46. The arrangement of the parts on the opposite side of the truck is similar to that just described and therefore a detail description of the same is omitted.

In the operation of this brake mechanism the motion is transmitted from the lever 20 to the lever 18, through the link 19, and to the equalizing lever 37 by means of the link 40. The movement of the link 40 applies the brake head 44 and then the point of connection with this brake acts as a fulcrum and causes the balance of the movement of the lever 37 to be transmitted to the brake head 45 and applies the same. The upper end of the dead lever 18 being connected with the dead lever anchor rod 28 all of the motion transmitted to it by the link 19 will be transmitted through the link 40 to the equalizing lever 36 and apply the brake heads 41 and 42.

It will thus be seen that I have provided a very simple mechanism for applying brakes on opposite sides of the same wheel and while I have illustrated a four-wheel truck it will be obvious that by the use of equalizing levers similar to the lever 36 in connection with either of the brakes 42 or 45 it would be possible to utilize this system on a truck having six or more wheels.

While I have shown the mechanism attached to the brake heads, it will be understood that the same effect would be produced by connecting the parts with the usual brake beams 47 and therefore I use the term brake head in the claims in a generic sense and intend to include the brake beams as well as the brake heads.

I have illustrated more or less diagrammatically the principles of my invention and I am aware that various changes can be made in the details of construction, within the scope of the claims, and therefore I do not wish to be limited to the details shown and described.

Having described my invention what I claim and desire to secure by Letters-Patent is, 1. In a car brake, the combination with the car body and swivel truck, of brake heads for the wheels on one side of the truck, substantially vertical levers connected with the brake heads, an equalizing link connected with each of said levers, a link connected with one of said vertical levers and with the car body at a point adjacent the transverse center line through the truck pivot, and actuating means connected with one of said vertical levers.

2. In a car brake, the combination with the car body and swivel truck, of brake heads for the wheels on one side of the truck, levers connected with said brake heads, means connected with said levers adapted to actuate the brake heads simultaneously, a link connected with one of said levers and with the car body at a point adjacent the transverse center line through the truck pivot, and actuating means connected with one of said levers.

3. In a car brake, the combination with the car body and swivel truck, of brake heads for the wheels on opposite sides of the truck, substantially vertical levers connected with the brake heads, equalizing links on opposite sides of the truck and connected with said levers. links connected with one of the said vertical levers on each side of the truck and with the car body adjacent the transverse center line through the truck pivot, and on opposite sides of the latter, a transverse equalizing lever, means connecting said equalizing lever with one of the said vertical levers on each side of the truck, and means carried by the car body for actuating said equalizing lever.

4. In a car brake, the combination with the car body and swivel truck, of brake heads for the wheels on opposite sides of the truck, levers connected with said brake heads, means connecting the said levers on each side of the truck and adapted to effect the simultaneous actuation of the brake heads, links, arranged on opposite sides of the truck, and each having one end connected with a separate one of said levers, means connecting the opposite ends of said links with the car body at points adjacent the transverse center line through the truck pivot, and actuating means connected with certain of said levers on opposite sides of the truck.

5. In a car brake, the combination with the car body and swivel truck, of brake heads for wheels on opposite sides of the truck, levers for actuating said brake heads, means connecting certain of said levers on opposite sides of the truck with points on the car body substantially on the transverse center line through the truck pivot, and actuating means connected with levers on opposite sides of the truck.

6. In a car brake, the combination with the car body and swivel truck, of brake heads for wheels on one side of the truck, levers connected with said brake heads for actuating the same, means connecting one of said levers with the car body at a point substantially on the transverse center line through the truck pivot, and actuating means connected with one of said levers.

7. In a car brake, the combination with a plurality of wheels on the same side of the car, of brake heads on corresponding sides of said wheels, an equalizing lever connected with said brake heads, a second lever connected with said equalizing lever, and a dead lever connected with said second lever and with the car body substantially on the transverse center line through the truck pivot.

8. In a car brake, the combination with a plurality of wheels on the same side of the car, of brake heads on corresponding sides of said wheels, an equalizing lever having one end thereof connected with one of the brake heads, a link extending alongside of one of the wheels and connecting the other end of said lever with another of the brake heads, a second lever connected with said equalizing lever at an intermediate point thereon, and a dead lever connected with said second lever and with the car body substantially on the transverse center line through the truck pivot.

9. In a car brake, the combination with a plurality of wheels on the same side of the car, of brake heads on opposite sides of each of said wheels, equalizing levers, means connecting each equalizing lever with brake heads on corresponding sides of different wheels, other levers connected with said equalizing levers, a link connecting said other levers together, and a dead lever connected with one of said other levers and with the car body substantially on the transverse center line through the truck pivot.

10. In a car brake, the combination with a plurality of wheels on the same side of the car, of brake heads on opposite sides of each of said wheels, equalizing levers, means connecting the opposite ends of each equalizing lever with brake heads on corresponding sides of different wheels, other levers connected with said equalizing levers, equalizing means connected with said other levers, actuating means connected with one of said other levers for actuating all of the brake heads simultaneously, and a dead lever connected with said second lever and with the car body substantially on the transverse center line through the truck pivot.

11. In a car brake, the combination with the car body and swivel truck, of brake members for wheels on opposite sides of the truck, dead levers connected with some of said brake members and with the car body at points substantially on the transverse center line through the truck pivot, live levers on opposite sides of the truck, an equalizing lever connected with the live levers, and actuating means connected with the equalizing lever.

In testimony whereof I affix my signature in presence of two witnesses.

WILLIAM F. KIESEL, Jr.

Witnesses:
CHAS. E. DARON,
B. C. McCORMICK.